March 25, 1969   D. E. WEBB   3,435,243
FILM FRAME DETECTION SYSTEM
Filed Jan. 3, 1966   Sheet 1 of 3
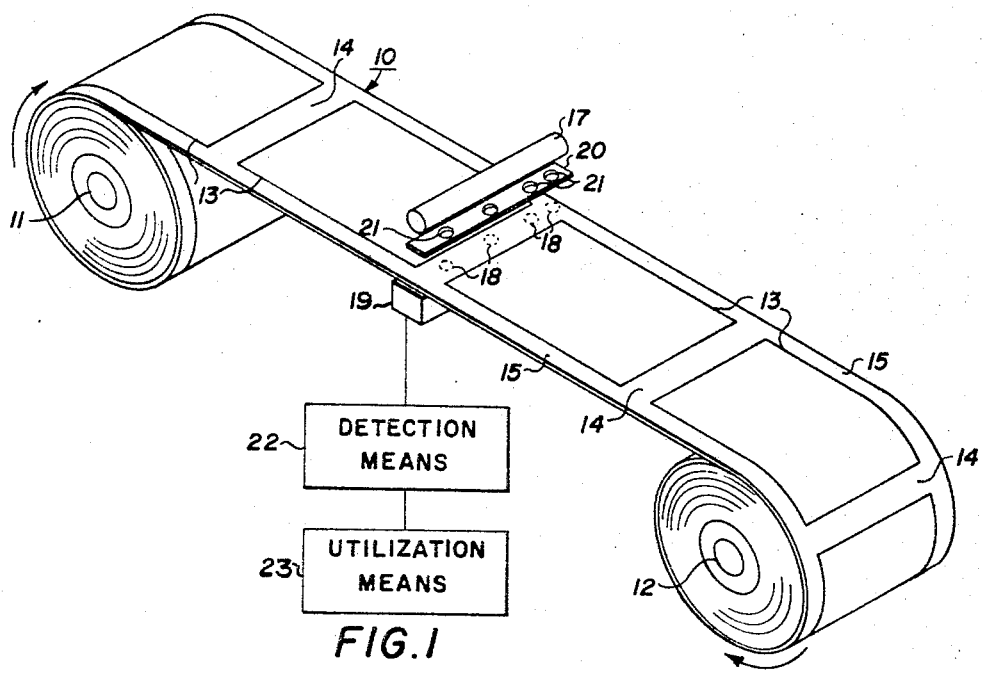
FIG. 1
FIG. 2
INVENTOR.
DOUGLAS E. WEBB
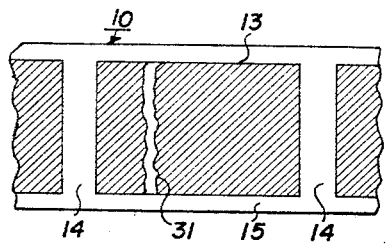
ATTORNEYS

United States Patent Office 3,435,243
Patented Mar. 25, 1969

3,435,243
FILM FRAME DETECTION SYSTEM
Douglas E. Webb, Webster, N.Y., assignor to Xerox Corporation, Rochester, N.Y., a corporation of New York
Filed Jan. 3, 1966, Ser. No. 518,334
Int. Cl. G01n 21/30
U.S. Cl. 250—219                                    16 Claims

ABSTRACT OF THE DISCLOSURE

An automatic detection system for identifying the location of frame information on strip film in which apparatus is provided for sampling the transmission characteristics across an incremental film width and supplying the data to an electronic circuit designed to produce a signal only when a true frame boundary is accurately detected on the moving film strip. The output signal is then used to enable a utilization device.

---

Figure 3:
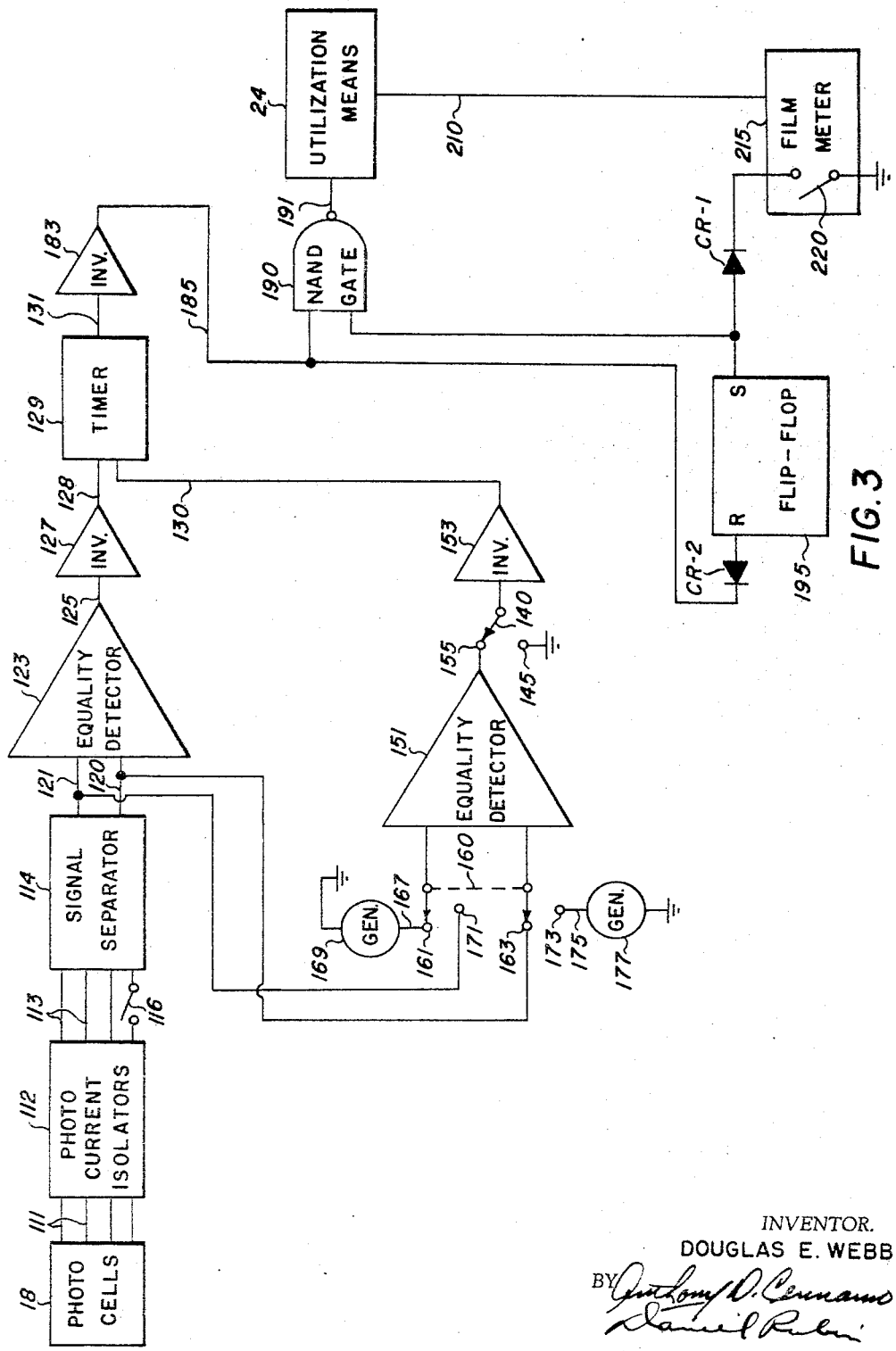

This invention relates to photography and, more particularly, to an automatic detection system for identifying the location of frame information on strip film.

Generally speaking, in photographic devices such as a conventional contact printer, it is desirable to have some means of rapidly determining which frame among many is currently at a printing zone or other reference point and after finding a frame to position that frame accurately in registration with the parameters of the reference such as a printing zone. This permits selected frames to be reproduced at random while ensuring that each selected frame will be optically positioned accurately relative to the recording medium to which it is to be exposed. When it is considered that the exposure time of a printer is relatively brief as compared to the time for film frame selection and positioning, the importance of an automatic identification and location in a high speed printer should be apparent.

Present techniques for identifying and locating frames on a film strip normally utilize a discernible mark or code on the processed film along the edges or in the space separation between frames. For example, one way to achieve this result has been to prenotch the film at reference points relative to the frames and which can then be sensed for counting or positioning by a suitable switching mechanism. Another technique has been to mark the film similarly with either dark or light indicia, depending on whether the original is a negative or a positive, respectively, and then to sense the indicia with a suitable photodetector. A serious drawback of these systems is that they require considerable prehandling of the film and otherwise require some form of permanent modification thereto.

Still another technique has attempted detecting the boundaries separating the frames by the use of a photocell. Since these boundaries usually have a density contrasting with the frame areas, photocell detection has worked satisfactorily under conditions in which the density contrasts can be relied on as unduplicated elsewhere on the film. However, this technique has proved unreliable for a broad range of applications. For example, the frame area can simulate the boundary or the latter does not contrast sharply enough with the frame information to register a detection. Also, where the film includes zones having continuous uniform density such as, in the case of film splicing or camera malfunction with the original photographs, it has not been possible to distinguish these zones from true frame boundaries.

Now in accordance with the present invention, there has been discovered a novel and highly sensitive automatic detection system for identifying and locating frame information on a moving film strip without precoding or premarking the film. Generally speaking this is achieved by sampling the transmission characteristics across an incremental film width and supplying the data to an electronic circuit designed to produce a signal only when a true frame boundary is accurately detected on the moving film strip. The sensitivity of the system is such that it can reliably distinguish a transmission differential between frame and boundary as close as .05. The signal output can then serve as an input to a utilization device such as a counter, film positioning apparatus, or the like as desired.

It is therefore an object of this invention to provide novel method and apparatus to identify the location of frame information on positive and negative film strips in photographic devices.

It is another object of this invention to provide a system for differentiating frame information from non-frame information on a moving film strip without premarking or precoding the film and with greater reliability than heretofore.

It is still another object of this invention to provide novel apparatus for automatically determining the presence of frame separations on both positive and negative film rolls wherein the density differential between separation and frame is as close as .05.

Figure 4:
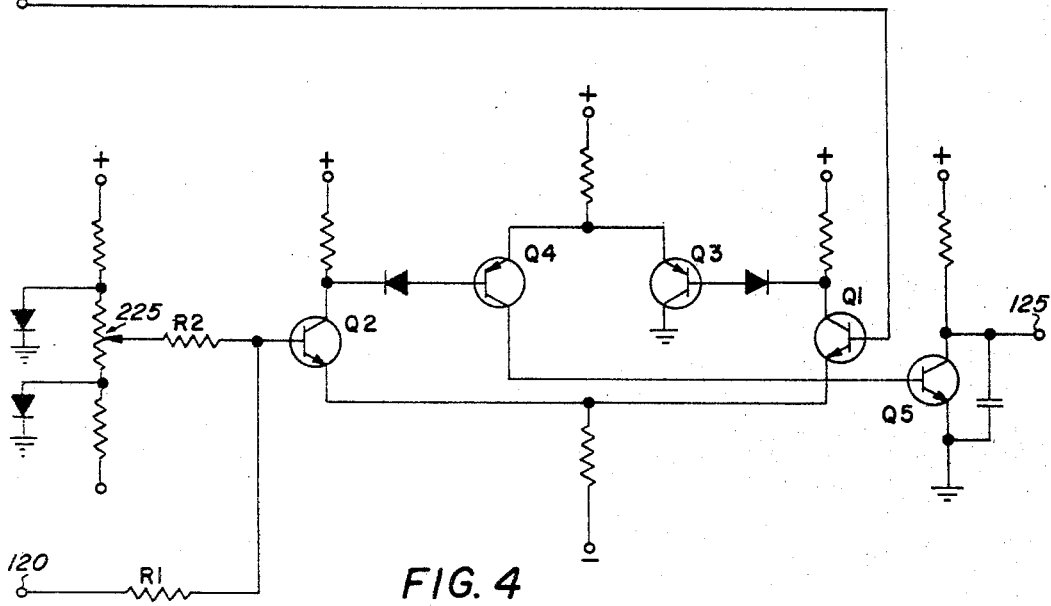
Figure 5:
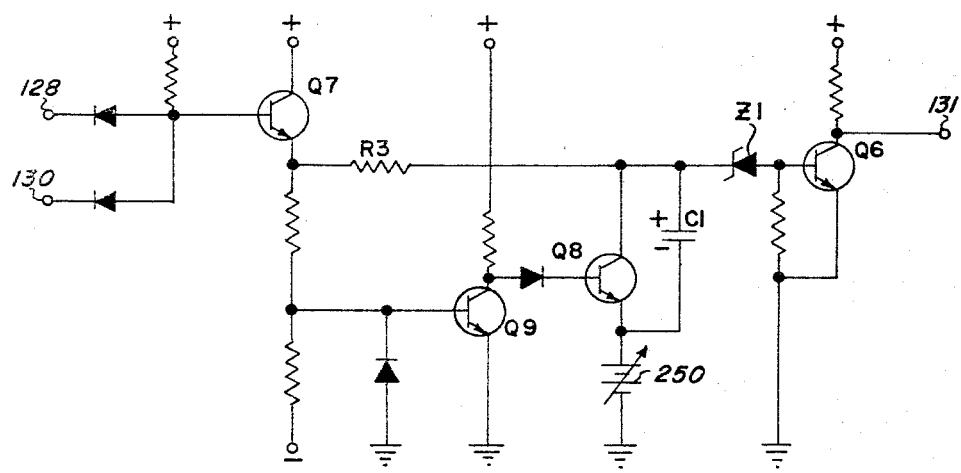

These and other objects of the invention will become apparent in the following description and drawings, in which:

FIG. 1 is an isometric view of apparatus according to the invention;
FIG. 2 is an exploded view of a particular film frame;
FIG. 3 is a block diagram of the detection system according to the present invention;
FIG. 4 is a circuit diagram for the equality detector blocks shown in FIG. 3; and,
FIG. 5 is a circuit diagram for the timer block shown in FIG. 3.

Referring now to FIG. 1 there is shown a film strip 10 which is being advanced from a supply spool 11 past a printing zone to a take-up spool 12 as is normal in photographic devices. For purposes of illustration, film strip 10 can be considered as negative in a photographic sense having information frames 13 separated by transparent transverse boundaries 14 and containing transparent edges 15. It is to be understood, however, that the invention is operative equally well with positive film strips as will be understood.

Located as to be shielded from any light sensitive materials to which the film will be exposed is a lamp 17 and a plurality of photocells 18 positioned on opposite sides of the film path. Radiation from lamp 17 is transmitted through film 10 across an incremental width thereof in samplings defined by spaced apertures 20 in mask 21 toward the surface of photocells 18. Photocells 18 situated below the film on support 19 convert the radiation samplings into discrete electrical signals which are proportional to the amount of radiation received. Thus, where the film density is high and reduced radiation reaches photocells 18, the output signals therefrom are low and vice versa. These electrical signals serve as inputs to a detection means 22 which produces an output to a suitable utilization means 23 when a true frame boundary 14 appears as will be understood.

Photocells 18 and apertures 20 may vary in number depending on the width of film strip 10, but preferably there are at least four so that sufficient samplings of the film density may be taken including one at film edge 15 for a purpose to be described. Moreover, instead of a single lamp 17 as a uniform source of illumination a plurality of lamps may be used.

FIG. 2 shows an exploded view of a particular frame 13 on film strip 10 having frame information 31 that would be generally undistinguishable by prior art simple photocell techniques but can readily be distinguished by the techniques hereof. Thus where a simple photocell is relied upon for identification, the density of frame information 31 and separations 14 being substantially alike, are not distinguishable. The photocell would therefore mistake two frames for the single frame 13 shown in the figure.

In accordance with the present invention, the detection system is capable of two modes of operation. If the film edge 15 has a continuous uniform density as shown in FIG. 2, then the system may be used in what is referred to as the "edge reference mode" wherein the film edge 15 is used as one of the sampling points observed by photocells 18. Where the film edge is unusable as a reference, a second mode of operation is used, termed "fixed reference." With the latter, all the utilized photocells 18 are contained within a distance corresponding to the frame width dimension.

Referring now to FIG. 3, there is shown in block diagram form the detection system according to the invention for distinguishing boundaries separating frame information on roll film 10. In this figure numerals are used to designate the signals as well as the paths conducting the signals where reference is made to signals. Signals 111 produced from photocells 18 are isolated from their respective sources by photocurrent isolators 112. The resulting signals 113, which are proportional to the transmissions sampled along any incremental film width, are introduced into a signal separator 114 where they are separated into a maximum signal 120 and a minimum signal 121, representative of the minimum and maximum transmission on the film width respectively. For fixed reference mode of operation a switch 116 is opened to uncouple the transmission signal generated by the photocell 18 positioned at film edge 15 from signal separator 114. As can be readily appreciated, unless signals 120 and 121 are equal or very nearly equal a frame boundary cannot likely occur, since the density along a boundary is generally uniform. In order to determine the equality of signals 120 and 121 they are fed into an equality detector 123 which produces a predetermined output signal 125 when these signals are equal or within a specified differential in a manner to be described in more particularity.

When equality detector 123 produces an output 125, there exists the possibility of a frame boundary. This is not conclusive, however, since there may also exist a uniform density across and within the frame information, as illustrated in FIG. 2. It is for this reason that output signal 125 is introduced into a timer 129 which can only produce a suitable output signal 131 when output 125 is held for a predetermined continuous period in a manner to be described. As is known in the art, it is often necessary to manipulate logic signals to insure compatibility with a particular logic element. Thus with equality detector 123 and timer 129, as will be described in more detail, it is desirable to invert output 125 in inverter 127 to obtain signal 128 for input to timer 129. Timer 129 has another input 130 which is coupled by means of a switch 140 to either a dummy signal 145 at ground when in the edge reference mode or a second equality detector 151 when in the fixed reference mode. With the film edge as an accurate reference for equality detector 123 the output 125 from equality detector 123 is sufficient indication that a frame boundary may exist and dummy signal 145 is used to complete the circuit after being inverted in inverter 153. In the case of fixed reference mode of operation, however, a further check is performed on minimum and maximum signals 120 and 121 by feeding them into second equality detector 151 where they are compared to a fixed reference signal as will be explained. The output 155 from equality detector 151 is then supplied to timer 129 along with output 125 from equality detector 123 after each output is inverted by inverters 153 and 127, respectively.

For the fixed reference mode of operation, switch 116 is opened and switch 140 connected to output 155 of equality detector 151 as illustrated. The purpose of equality detector 151 is to take the place of the edge reference signal compared in equality detector 123 where this signal cannot be utilized because the density along film edge 15 is non-uniform. The operation of equality detector 151 is similar to that of equality detector 123 as will be shown hereinafter. Maximum signal 120 and maximum signal 121 are coupled to equality detector 151 through a double pole switch 160. When switch 160 is connected across terminals 161 and 163 as shown in the figure, equality detector 151 compares maximum signal 120 with a simulated high density reference signal 167 from generator 169. In this case for there to be a suitable output 155, maximum signal 120 must be positive with respect to signal 167 which approximates a frame boundary signal on negative film. For identification of frames on positive film switch 160, is connected across terminals 171 and 173 connecting the equality detector to minimum signal 121 and a simulated low density reference signal 175 from generator 177. When signal 121 is negative with respect to signal 175 which approximates a frame boundary on positive film, a suitable output 155 occurs.

The output 131 of timer 129 could be supplied to a utilization means 24 as an indication of a frame boundary since the conditions of contrast for a predetermined time have been met. However, to guard against a situation where the film 10 has continuous uniform density, such as, in the case of film splicing of camera malfunction with the original photographs and that could be inaccurately detected as frame boundaries a further precaution is provided for. In order to accomplish this, output 131 which indicates a ground or low potential condition for a frame boundary is inverted by inverter 183 to a high level signal 185 that is supplied both as an input to a NAND gate 190 and to the reset terminal of a flip-flop 195 which is collector coupled for reset operation. The set terminal of flip-flop 195 is also connected to NAND gate 190 which produces an output signal 191 to a utilization means 24 when a true frame boundary condition exists. Utilization means 24 can be a braking device by which film 10 may be stopped in registration with the printing zone of a photographic machine, such as, the contact printer described in copending patent application Ser. No. 491,910, filed Oct. 1, 1965 now Patent No. 3,379,110. As shown in the figure utilization means 24 provides a feed back signal 210 to a film meter 215 that includes a switch 220 coupling the set terminal of flip-flop 195 to ground. Switch 220 is designed to close momentarily just long enough to set flip-flop 195 at a potential such that NAND gate 190 cannot produce an output 191 until flip-flop 195 has been reset by signal 185 indicating a no boundary condition.

In operation where utilization means 24 is, for example, a braking device, a frame boundary signal 191 from NAND gate 190 acts to stop the transport of film 10. Upon restarting the film transport, feed back signal 210 causes switch 220 to close momentarily until a specified length of film which is desirably less than a frame length, has traversed photocells 18. During the interval that switch 220 remains closed the set terminal of flip-flop 195 is coupled to ground preventing a high signal condition input to NAND gate 190 and simultaneously triggering flip-flop 195 to set condition, i.e., output terminal S of flip-flop 195 is grounded through diode CR–1. This condition persists even when switch 220 opens until such time as flip-flop 195 can be reset by the application of a low signal input to output terminal R through diode CR–2. To obtain another frame boundary output 191 from NAND gate 190, signal 185 must first indicate a no frame boundary or low signal condition to reset flip-flop 195 and then return to a frame boundary or high signal condition. As can readily be appreciated this means that the film will not continually be stopped in a continuous density zone mistaken for a frame boundary but will continue to move until the next true frame boundary appears at photocells 18.

The circuitry for equality detectors 123 and 151 is best shown in FIG. 4 and is the same in both cases so that only one need be discussed. Minimum signal 121 is connected to the base of a transistor Q1 and maximum signal 120 is connected via a resistor R1 to the base of transistor Q2. A potentiometer 225 is used to calibrate the bias on the base of transistor Q2 across resistor R2. Resistors R1 and R2 are selected so that $$\frac{R_2}{R_1+R_2}$$

defines as a percentage the percent of maximum signal 120, which minimum signal 121 must be before a condition of equality is met. It has been found that percentages ranging from 100 to about 80 perform well for an extremely wide range of applications. When the minimum signal 121 is not within the prescribed percentage of maximum signal 120 as determined by the values of R1 and R2, transistors Q1 and Q3 are turned on. Since the emitters of Q1 and Q2 are connected to a single source, when Q1 is turned on, Q2 is off and vice versa. However, when Q2 is on, Q4 also conducts, thereby turning on Q5 which is normally biased off. Thus, when a condition of equality between the maximum signal 120 and minimum signal 121 exists, Q5 conducts indicating a ground or low level condition for signal 131. In other words there is a possible boundary separation between adjacent information frames on the film. As already mentioned, equality detector 151, which compares either maximum signal 120 with a fixed high density reference signal 167 or minimum signal 121 with a fixed low density reference signal 175 operates in the same manner as the equality detector just described. By adjusting potentiometer 225 it is possible to vary the differential between signals 120 and 121 and their respective reference signals for there to exist a condition of equality.

Referring now to FIG. 5, there is shown the circuitry of timer 129 which produces a suitable output signal when an equality is maintained for a predetermined time duration to indicate more accurately that there is a frame boundary being detected. It should be understood that this time is based on such factors as the transport speed of the film and the minimum width of an expected frame boundary. The timer circuit produces an output 131 at ground level when transistor Q6, which is normally biased off, is turned on. For this condition to occur, the biasing voltage on the base of Q6, as determined by the breakdown voltage of Zener diode Z1 must forward bias the base-emitter junction. The conduction of Q6 is regulated by setting voltage source 250 to some value below the necessary bias and relying upon the charging potential on capacitor C1 to obtain the specific voltage necessary for Q6 to conduct. As can readily be appreciated, the input signals 128 and 130 to the timer circuit must both be high signals which are sufficiently continuous in accordance with a time constant determined by the values of R3 and C1 to charge C1 to the voltage level necessary for a breakdown of the Zener diode. The greater the potential set on voltage source 250, the less time it takes to charge up C1. A dumping transistor Q8 is provided for shunting C1 when either of the input signals to base of Q7 goes to ground which causes Q9 to turn off. It should be realized that the time to dump C1 is relatively short so that the duration of equality for signals 128 and 130 starts anew in the event that there is a change in either of these signals. As has already been described, the output 131 across the collector-emitter of Q6 is grounded for a frame boundary and is inverted before being fed into NAND gate 190 and the reset terminal of flip-flop 195.

Above is described a system enabling identification and location of frame information on moving a film strip in a photographic apparatus such as a contact printer. Heretofore it has been necessary to specially premark or precode the film strips for subsequent detection in order to accurately determine the location of information frames. With the present invention, electronic means are used to compute the presence of the frame boundary automatically and without the burden and expense of pretreating or otherwise detracting from the quality of image reproduction. Moreover the system is flexible to permit two modes of operation depending on whether or not the film edge is usable as a reference for boundary location. Hence, an accurate determination of the location of frame information may be accomplished while the film is being transported in a photographic device.

It should be understood that with the invention above any number of photocells may be used depending upon the width of the film. A relay coil can be used for cutting in and out individual photocells in a manner which is well known. It should be further understood that other known electronic devices could be substituted for those described where desired as, for example, any suitable gating device could be used in place of NAND gate 190. Other modifications may become apparent to those skilled in the art and may, of course, be resorted to without departure from the spirit and scope of the invention as defined in the following claims.

What is claimed is:

1. A method for identifying the location of frame information on a moving film strip containing a plurality of space separated frames and comprising the steps of:
    (a) sampling a plurality of densities across an incremental width of said film strip during the movement thereof,
    (b) converting the densities sampled into discrete electrical signals,
    (c) separating said discrete electrical signals into a maximum signal and a minimum signal,
    (d) comparing said maximum and minimum signals to ascertain the existence of a predetermined equality therebetween indicative of space between adjacent frames on the film,
    (e) timing for a predetermined period the persistence of the equality compared signals in said last recited step and on expiration of said time period emitting an output signal indicative of said persistence for said complete timed period, and
    (f) coupling said output signal to a utilization device.

2. A method according to claim 1 wherein said sampling step includes utilizing the film edge of a density alike the space between frames to produce a reference signal to be compared.

3. A method according to claim 1 in which said maximum signal is also compared with a fixed reference signal to ascertain the existence of a predetermined equality therebetween and said last recited comparison is cotimed jointly with said equality timing of said maximum and minimum signals to emit after expiration of said time period an output signal representative of timed persistence equality of both of said comparisons.

4. A method according to claim 1 in which said minimum signal is also compared with a fixed reference signal to ascertain the existence of a predetermined equality therebetween and said last recited comparison is cotimed jointly with said equality timing of said maximum and minimum signals to emit after expiration of said time period an output signal representative of timed persistence equality of both of said comparisons.

5. A method according to claim 1 wherein said output signal is gated with a feedback signal coupled to said utilization device.

6. A method according to claim 3 wherein said output signal is gated with a feedback signal coupled to said utilization device.

7. A method according to claim 4 wherein said output signal is gated with a feedback signal coupled to said utilization device.

8. In a photographic device in which a film strip containing a plurality of space separated frames is transported, apparatus for identifying the location of frame information on said film strip comprising in combination:
(a) means for advancing said film strip along a predetermined path;
(b) means for detecting film densities at predetermined locations across the width of said advancing film strip and generating discrete electrical signals indicative of said film densities;
(c) means for separating said discrete electrical signals into a maximum density signal and a minimum density signal;
(d) means responsive to a predetermined equality between said maximum and minimum signals to emit an equality signal,
(e) circuit means for receiving said equality signal and for registering an output indicative of a true frame boundary, and
(f) utilization means coupled to said circuit means.

9. Apparatus according to claim 8 wherein said circuit means includes timer means and gating means responsive to said timer means.

10. Apparatus according to claim 9 wherein one input to said timer means is coupled to a dummy signal generator.

11. Apparatus according to claim 9 wherein one input to said timer means is based on a predetermined equality between a fixed reference signal and said maximum signal.

12. Apparatus according to claim 9 wherein one input to said timer means is based on a predetermined equality between a fixed reference signal and said minimum signal.

13. Apparatus according to claim 9 wherein said timer means includes a transistor element having base, emitter, and collector electrodes, a threshold sensitive Zener diode connected in series to said base electrode, a capacitance connected to a common terminal with said Zener diode settable voltage regulating means for adjusting the potential supplied to said capacitance, and means for applying a voltage level at said common terminal sufficient to overcome said threshold on said Zener diode and cause said transistor element to conduct while the input to said timer is representative of a frame boundary.

14. Apparatus according to claim 9 wherein one input to said gating means is a flip-flop coupled to said timer means and to said utilization means.

15. A film frame detection system for identifying frame information on a moving film strip according to boundaries separating side frame information comprising:

(a) photodetector means for sampling a plurality of densities across the width of said moving film strip and generating discrete electrical signals indicative of said film densities,
(b) signal separator means coupled to the output of said photodetector means for emitting only the maximum and minimum of said foregoing electrical signals,
(c) equality detector means coupled to the output of said signal separator for comparing peaks of said maximum and minimum signals and for emitting a signal indicative of a predetermined equality therebetween,
(d) timer means coupled to said equality detector for emitting an output signal if its input signal persists beyond a predetermined time,
(e) flip-flop circuit means,
(f) a gate coupling said timer means with said flip-flop means, and
(g) utilization means coupled to the output of said gate producing a feedback signal to said flip-flop means.

16. A film frame selection system in accordance with claim 15 and further comprising a second equality detector means for comparing peaks of said maximum signal with a fixed reference signal and emitting a signal indicative of a predetermined equality therebetween whereby said timer means indicates the joint persistence of outputs from said first equality detector and said second equality detector for a predetermined period.

References Cited

UNITED STATES PATENTS

| 2,818,467 | 12/1957 | Harris et al. | 250—219 |
| 2,835,165 | 5/1958 | Smith | 250—219 |
| 2,985,065 | 5/1961 | Haynes et al. | 250—219 |
| 3,066,225 | 11/1962 | Uphoff | 250—219 |
| 3,146,432 | 8/1964 | Johnson | 250—219 |

OTHER REFERENCES

Dym et al.: Densitometric Computer, IBM Technical Disclosure Bulletin, volume 8, No. 1, June 1965.

RALPH G. NILSON, *Primary Examiner.*

BRUCE L. ADAMS, *Assistant Examiner.*

U.S. Cl. X.R.

88—14